(12) United States Patent
Kim et al.

(10) Patent No.: US 12,528,102 B2
(45) Date of Patent: Jan. 20, 2026

(54) METHOD FOR PREPARING POROUS POLYMER FILM HAVING CONTROLLED PORE DEPTH, AND POROUS POLYMER FILM PREPARED THEREBY

(71) Applicant: Industry-University Cooperation Foundation Hanyang University, Seoul (KR)

(72) Inventors: Dong Rip Kim, Seoul (KR); Han Min Jang, Seoul (KR); Sung Won Jo, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 821 days.

(21) Appl. No.: 17/288,599

(22) PCT Filed: Oct. 30, 2019

(86) PCT No.: PCT/KR2019/014435
§ 371 (c)(1),
(2) Date: Apr. 26, 2021

(87) PCT Pub. No.: WO2020/091402
PCT Pub. Date: May 7, 2020

(65) Prior Publication Data
US 2021/0394231 A1 Dec. 23, 2021

(30) Foreign Application Priority Data
Oct. 31, 2018 (KR) .................. 10-2018-0131463

(51) Int. Cl.
*B05D 3/04* (2006.01)
*B01D 71/70* (2006.01)
*B05D 1/02* (2006.01)
*B05D 5/00* (2006.01)
*C08G 77/04* (2006.01)
*H02S 40/22* (2014.01)

(52) U.S. Cl.
CPC .......... *B05D 3/046* (2013.01); *B01D 71/701* (2022.08); *B05D 1/02* (2013.01); *B05D 3/0446* (2013.01); *B05D 5/00* (2013.01); *C08G 77/045* (2013.01); *B01D 2323/218* (2022.08); *B01D 2323/2181* (2022.08); *B01D 2325/43* (2022.08); *B05D 2201/02* (2013.01); *B05D 2518/10* (2013.01); *H02S 40/22* (2014.12)

(58) Field of Classification Search
CPC .................................................. B05D 3/046
See application file for complete search history.

(56) References Cited

U.S. PATENT DOCUMENTS

| | | | | |
|---|---|---|---|---|
| 3,469,423 A | * | 9/1969 | Heinz | F26B 13/16 68/5 R |
| 4,059,425 A | * | 11/1977 | Brydges, III | C03B 19/08 65/30.12 |
| 5,466,417 A | * | 11/1995 | Seki | A61L 2/07 422/26 |
| 6,454,996 B1 | * | 9/2002 | Lin | A23K 30/10 422/26 |
| 2002/0183409 A1 | * | 12/2002 | Seyanagi | C08J 9/0061 521/155 |
| 2010/0147363 A1 | * | 6/2010 | Huang | B32B 3/08 136/251 |
| 2011/0297207 A1 | | 12/2011 | Ishihara et al. | |
| 2015/0017725 A1 | * | 1/2015 | Taki | A61P 35/00 427/2.11 |
| 2017/0003594 A1 | * | 1/2017 | Somu | G03F 7/40 |

FOREIGN PATENT DOCUMENTS

| | | |
|---|---|---|
| JP | 63-267406 A | 11/1988 |
| JP | 2010-113158 A | 5/2010 |
| KR | 10-2009-0087665 A | 8/2009 |
| KR | 10-2012-0052775 A | 5/2012 |
| KR | 10-1401019 B1 | 5/2014 |
| KR | 10-1500167 B1 | 3/2015 |
| KR | 10-2016-0015226 A | 2/2016 |

OTHER PUBLICATIONS

KR 1020120052775—translation (Year: 2012).*
Communication issued Jul. 16, 2021 by the Korean Patent Office in application No. 10-2018-0131463.
International Search Report of PCT/KR2019/014435 dated Feb. 6, 2020 [PCT/ISA/210].

* cited by examiner

*Primary Examiner* — Irina Krylova
(74) *Attorney, Agent, or Firm* — Sughrue Mion, PLLC (57) ABSTRACT

The present invention relates to a method for preparing a porous polymer film having a controlled pore depth, and a porous polymer film prepared thereby. A method for preparing a porous polymer film according to the present invention allows the pore depth of a porous film to be controlled simply and at a low cost, and thus allows adjustment of the light reflectance of the prepared film. A large-area film can be prepared by means of a simple method and thus can be applied to various industry fields. Films having different reflectance can be prepared and thus can be applied as low-reflection and high-reflection films for solar cells, and also as a low-reflection or high-reflection thin polymer film in the construction field or material and equipment field.

18 Claims, 12 Drawing Sheets

[FIG. 1]

Preparation of low-reflection stretchable polymer film

Mixing liquid thermosetting polymer with curing accelerator

Applying mixed liquid thermosetting polymer

Permeation of high temperature and high pressure water molecules and thermal curing of polymers Drying residual moisture

Preparation of high-reflection stretchable polymer film

Mixing liquid thermosetting polymer with curing retarder

Applying mixed liquid thermosetting polymer

Permeation of high temperature and high pressure water molecules and thermal curing of polymers Drying residual moisture

METHOD FOR PREPARING POROUS POLYMER FILM HAVING CONTROLLED PORE DEPTH, AND POROUS POLYMER FILM PREPARED THEREBY

CROSS REFERENCE TO RELATED APPLICATIONS

This application is a National Stage of International Application No. PCT/KR2019/014435 filed on Oct. 30, 2019, claiming priority based on Korean Patent Application No. 10-2018-0131463 filed on Oct. 31, 2018.

TECHNICAL FIELD

The present invention relates to a method for preparing a porous polymer film having a controlled pore formation depth, and a porous polymer film prepared thereby, and more particularly, to a method for simply and inexpensively controlling the depth of pores formed in the film by adjusting the curing rate of the polymer during the curing step of the polymer film, and further controlling the light reflectance of the polymer film.

BACKGROUND OF THE INVENTION

Porous polymer films are produced by a combination of various polymer raw materials and porosification techniques. The porous polymer film may exhibit characteristic functions depending on its porosity size, porosity ratio, surface properties, and the like.

For example, foams such as expanded polystyrene and expanded polyurethane are used in a wide range of fields as lightweight structural materials, insulation materials, and cushioning materials in houses, automobiles, and home appliances. In addition, a porous film having a fine pore size ranging from nanometer to micrometer is also used as a separation membrane, a permeable membrane, a separator for a secondary battery, a hemodialysis membrane, and the like. Recently, research has been also conducted to form a water-repellent or superhydrophobic surface by forming a fine pattern on the surface or inner surface of the polymer film.

Meanwhile, in connection with the recent advent of flexible devices including wearable devices, various studies have been actively conducted on a method of supplying power to these devices. Among power supply devices that can be used anywhere and have easy portability, solar cells are in the spotlight as a renewable energy source.

Such solar cells are being made to have a thin film form and flexibility. To this end, it is necessary to provide a low-reflection layer (anti-reflective layer) and a back reflective layer that are flexible and improve the light absorption rate of the solar cell as much as possible. However, it is difficult to apply a low-reflection coating (anti reflective coating) and a back reflector used in a general inorganic solar cell to a flexible thin-film solar cell as it is.

In this regard, Korean Patent Publication No. 10-1500167 discloses the use of a transparent polymer film having a surface treated with a fine lattice pattern, as an antireflection treatment film for reducing the surface reflection of an optical element. In this document, it is described that light absorption rate can be improved by forming a plurality of fine pattern protrusions on the surface of a transparent polymer film and using it as a surface low-reflection coating for solar cells, etc. However, since a master mold having the same structure must be manufactured to form a fine lattice pattern, there is a disadvantage in that the process is complicated and expensive.

In addition, Korean Patent Publication No. 10-1401019 discloses a white polyester high-reflection film that can be used as a back reflective sheet for a solar cell. The document discloses a porous polymer film having high reflection performance by forming pores inside the polyester. In this document, however, although it is possible to provide pores in the entire polymer because the method of foaming the polymer is used, there is a problem in that it is not possible to control the depth at which pores are formed from the polymer surface.

Therefore, if it is possible to implement a porous structure on the surface of the transparent polymer film or to control the depth of the porous structure penetrating to the inside, it is expected that it will be possible to provide a flexible porous polymer film that can replace the existing low-reflection coating and back high-reflection film.

SUMMARY OF THE INVENTION

Technical Problem

An object of the present invention for solving such a problem is to provide a method of preparing a porous polymer film in which the pore formation depth is controlled simply and inexpensively.

It is also an object of the present invention to provide a light reflective polymer film in which light reflectance is adjusted by controlling the pore formation depth.

Technical Solution

In order to achieve the above object, the present invention provides a method for preparing a porous polymer film, the method comprising the steps of: applying a thermosetting polymer resin on a substrate; and curing the thermosetting polymer resin while spraying vapor thereto, wherein a pore formation depth is controlled by adjusting the curing rate of the thermosetting polymer resin.

The method of the present invention may further comprise the step of forming the thermosetting polymer resin into a semi-solid state before the step of spraying vapor to the thermosetting polymer resin.

The method of the present invention may accelerate the curing of the thermosetting polymer resin to form a porous structure only on the surface of the porous polymer film.

The method of the present invention may retard the curing of the thermosetting polymer resin to form a porous structure on the surface and inside of the porous polymer film.

In the present invention, the thermosetting polymer resin may be selected from the group consisting of polydimethylsiloxane (PDMS), silicone rubber, polymethyl methacrylate (PMMA), polyurethane (PU), polyester, polyimide (PI), polycarbonate (PC) and epoxy resin.

In the method of the present invention, the step of curing the thermosetting polymer resin is performed while spraying the vapor of 100 to 140° C. and 70 to 200 kPa.

In the present invention, the thermosetting polymer resin may contain a curing accelerator.

In the present invention, the thermosetting polymer resin may contain a curing retarder.

In the present invention, the porous polymer film may have an elongation of 300% or more.

The method of the present invention may be characterized in that the porous polymer film is a light reflective film, and the light reflectance is adjusted by controlling the pore formation depth.

The method of the present invention may be characterized in that the substrate is a stretchable polymer, and the method further comprises the steps of: stretching the stretchable polymer before the step of applying the thermosetting polymer, and releasing the stretching of the stretchable polymer after the step of curing the polymer.

In addition, the present invention provides a light reflective polymer film prepared by the above method and having a light reflectance adjusted by controlling the pore formation depth.

In the present invention, the light reflectance may be adjusted by controlling the elongation of the light reflective polymer film.

In the present invention, the light reflective polymer film may have an elongation of 300% or more.

In addition, the present invention provides a low-reflection polymer film prepared by the above method and prepared by accelerating the curing of the thermosetting polymer resin.

In addition, the present invention provides a high-reflection polymer film prepared by the above method and prepared by retarding the curing of the thermosetting polymer resin.

In addition, the present invention provides a self-powered device, comprising:
- a power supply unit comprising a solar cell module;
- a driving unit receiving power from the power supply unit to drive the device; and
- a cover body accommodating the power supply unit and the driving unit therein and made of a material capable of transmitting light,
- wherein a low-reflection polymer film prepared by the above method and prepared by accelerating the curing of the thermosetting polymer resin is attached to an upper surface of the cover body; and
- a high-reflection polymer film prepared by the above method and prepared by retarding the curing of the thermosetting polymer resin is attached to a lower surface of the cover body.

In the present invention, the cover body may be in the form of a spherical lens for concentrating the transmitted light to the solar cell.

In the present invention, the high-reflection polymer film may be water-repellent.

Advantageous Effects

The method for preparing a porous polymer film according to the present invention allows the pore formation depth of a porous film to be controlled simply and at a low cost, and thus allows adjustment of the light reflectance of the prepared film. In addition, a large-area film can be produced by means of a simple method and thus can be applied to various industry fields. Further, films having different reflectance can be prepared and thus can be applied as low-reflection and high-reflection films for solar cells, and also as a low-reflection or high-reflection thin polymer film in the construction field or material and equipment field.

DETAILED DESCRIPTION OF THE INVENTION

Unless otherwise defined, all technical and scientific terms used in this specification have the same meaning as commonly understood by those skilled in the art to which the present invention belongs. In general, the nomenclature used in the specification is well known and commonly used in the art.

The present invention relates to a method for producing a porous polymer film.

The method may comprise the steps of: applying a thermosetting polymer resin on a substrate; and curing the polymer resin while spraying vapor thereto.

In the method of the present invention, water molecules penetrated by the vapor during the curing process of the thermosetting polymer resin can be evaporated in a subsequent drying process to produce a polymer film having a porous structure, and further, the depth at which the porous structure of the polymer film is formed can be controlled by adjusting the curing rate of the polymer resin, and the temperature, pressure, spraying time and the like of the vapor.

More specifically, when the curing rate of the thermosetting polymer resin is controlled to be faster than a permeation rate of the water vapor, a film having a porous structure formed only on the surface of the polymer film can be produced. In addition, when the curing rate of the thermosetting polymer resin is controlled to be slower than the permeation rate of the water vapor, a film having a porous structure formed even inside the polymer film can be produced.

In the method of the present invention, the step of applying the thermosetting polymer resin on the substrate is preferably conducted in a liquid state before the thermosetting polymer is cured.

As the substrate, any substrate may be used to form the porous polymer film of the present invention, and for example, a substrate such as glass, metal, silicon wafer, etc. may be used. It is also possible to use a release paper which can be removed after production of the porous polymer film. Alternatively, as described later, a stretchable polymer may be used as the substrate.

In an exemplary embodiment of the present invention, a device such as a solar cell can be used as the substrate to attach the porous polymer film to a surface of the solar cell.

The thermosetting polymer is preferably a transparent, flexible or stretchable polymer suitable for the intended use. For example, the thermosetting polymer may be polydimethylsiloxane (PDMS), silicone rubber, polymethyl methacrylate (PMMA), polyurethane (PU), polyester, polyimide (PI), polycarbonate (PC), epoxy resin, or the like. More preferably, polydimethylsiloxane (PDMS) or silicone rubber may be used. The thermoplastic polymer may include additives or catalysts for adding various properties.

The applied thickness of the thermosetting polymer may be any thickness suitable for the application of the film to be used, for example, 0.1 to 10 mm, preferably 0.2 to 1 mm.

It is preferable that the manufacturing method of the present invention further includes the step of forming the polymer resin into a semi-solid state before the step of spraying the vapor to the polymer resin. When the thermosetting polymer is formed in a semi-solid state, the shape of the polymer is not greatly disturbed, and therefore, it is easy to form pores by spraying the vapor to the thermosetting polymer resin.

In the step of forming the thermosetting polymer resin into a semi-solid state, it is preferable that the thermosetting polymer resin is cured at 30 to 50° C. for 1 to 2 hours. If the above-mentioned range is not satisfied, there is a problem that it takes too much time to be formed in a semi-solid state, the semi-solid is not formed, or the polymer resin is completely solidified. The semi-solid state may have, for example, a viscosity of 10 to 1,000 Pa-s, preferably 30 to 600 Pa-s.

A porous structure may be formed on a surface or on a surface and inside of the thermosetting polymer by spraying high temperature and high pressure vapor to the thermosetting polymer. The step of spraying the vapor may be performed by placing the thermosetting polymer resin inside a pressure vessel capable of forming high temperature and high pressure, placing water on a bottom of the vessel, and then applying the high temperature and high pressure to form the vapor.

The vapor is preferably sprayed at 100 to 140° C. and 70 to 200 kPa, more preferably at 100 to 120° C. and 80 to 140 kPa. The spraying time of the vapor may be controlled according to the desired pore formation depth, and is preferably performed for 1 minute to 1 hour, more preferably for 10 to 30 minutes. The temperature, pressure, and spraying time of the vapor are described based on a polydimethylsiloxane (PDMS) polymer resin, and are not necessarily limited the above ranges. Depending on the type and performance of the vapor generating device, or depending on the boiling point temperature that changes according to the pressure of the vapor, the temperature and pressure conditions may be varied within a range that does not change the essential characteristics capable of forming the desired microporous structure.

In the step of spraying the vapor, the thermosetting polymer is preferably located at a position of 1 to 30 cm, preferably 5 to 20 cm from the ceiling of the pressure vessel. If the position of the polymer is too low, it may become close to a heat source of the bottom surface for increasing the internal temperature of the pressure vessel, thereby making it difficult to control the curing rate as intended.

In a preferred embodiment of the present invention, the thermosetting polymer resin may contain a curing accelerator or a curing retarder. The curing accelerator or curing retarder may control the time for the vapor to penetrate the surface of the polymer by controlling the curing rate of the thermosetting polymer resin, thereby controlling the pore formation depth of the finally produced polymer film.

The curing accelerator may rapidly accelerate the curing of the polymer resin so that the pores of the porous polymer film are formed only in the vicinity of the surface. As the curing accelerator, most of the curing accelerators known in the art can be used. For example, when an addition-type silicone material based on a platinum catalyst is used as the polymer resin, a general curing accelerator containing a large amount of a platinum catalyst can be used. The components of such curing accelerator are based on polyorganosiloxane and contain platinum-siloxane (platinum(0)-1,3-diviinyl-1,1,3,3-tetramethyldisiloxane, $O[Si(CH_3)_2 CH=CH_2]_2Pt$) component, and, when mixed with the addition-type silicone based on the platinum catalyst in a certain ratio, can expedite the reaction of the platinum catalyst to accelerate the curing.

The curing retarder serves to slow the curing of the polymer resin and allows vapor to penetrate deep into the polymer resin to form a porous structure inside of the film as well. Most of the curing retarders known in the art may be used as the curing retarder. For example, when an addition-type silicone material based on a platinum catalyst is used as a polymer resin, a curing retarder containing components such as organotin compound, sulfur, polysulfone, amines, etc. which can retard bonding due to a platinum catalyst may be used and serves to inhibit the activity of the platinum catalyst to retard the polymer from becoming solid.

It is preferable that the curing accelerator or curing retarder is used in an appropriate ratio depending on the type of the thermosetting polymer and the depth of pores to be formed. For example, the curing accelerator or curing retarder may be used in an amount of 1 to 30% by weight, preferably 5 to 20% by weight based on the total weight of the polymer resin. When the curing accelerator is used in an amount greater than 30% by weight, it is difficult to form a porous structure because the speed at which the polymer resin is cured is too fast.

The cured polymer may be subjected to a drying process to remove residual moisture on the polymer surface to complete the porous polymer film. The drying may be performed at 50 to 100° C. for 10 minutes to 1 hour.

In an exemplary embodiment of the present invention, a stretchable polymer may be used as the substrate to produce a porous polymer film. Specifically, the method may include the steps of: stretching a cured stretchable polymer; applying a liquid thermosetting polymer onto the stretched stretchable polymer; curing the liquid thermosetting polymer resin while spraying vapor thereto; and releasing the stretching of the stretchable polymer substrate. According to the method, when the stretching is released, the porous structure of the film formed in the stretched state forms a wrinkled structure, and at the same time, a fine porous structure is formed on the surface of the wrinkled structure to form a hierarchical porous structure.

As the stretchable polymer, an ultra-stretchable polymer having an elongation of 300 to 1500% is preferable, and a polymer having an elongation of 500 to 1000% is more preferable. For example, a thermosetting platinum catalyst-based silicone elastomer may be used, and commercially available stretchable products satisfying the elongation range as mentioned above may also be used. For example, stretchable products such as Ecoflex™, SORTA-Clear™, and Dragon Skin™, which are available from Smooth-on in the United States, may be used.

Figure 14:
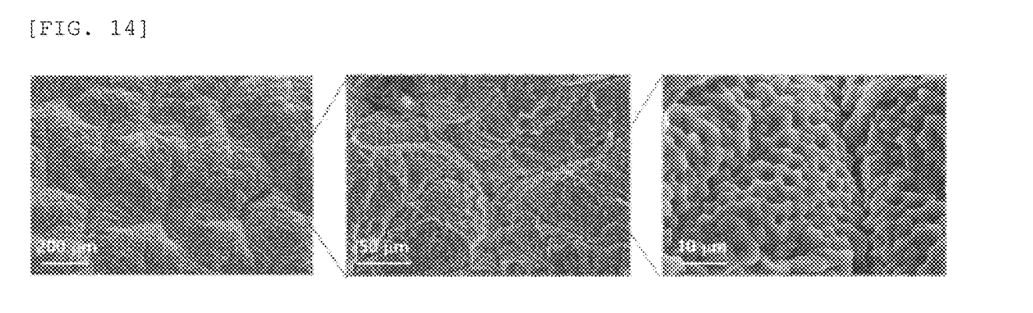
FIG. 14 shows an SEM image of a film in which a hierarchical porous structure is formed according to an exemplary embodiment of the present invention.

A SEM image of the porous polymer film produced by the above method is shown in FIG. 14. It can be seen that wrinkles are formed on the film as a whole, and pores are formed on the surface of the wrinkles. The film exhibited a very low reflectance of about 3.3%, which is less than half of the reflectance (about 7.5%) of the flat ultra-stretchable polymer. This is due to the wrinkles of the film and the porous structure formed in the wrinkles.

In a preferred embodiment of the present invention, the porous polymer film may be a light reflective film.

As described above, in the method of producing a porous polymer film according to the present invention, the pore formation depth of the polymer film may be controlled by using a curing accelerator or a curing retarder, or by adjusting a time for spraying the vapor.

The inventors of the present invention have found that it is possible to control the light reflectance of the produced film by controlling the pore formation depth.

In one embodiment of the present invention, the porous polymer film is a transparent flexible film, and may be used as a low-reflection polymer film in which pores are formed only on the surface of the film.

In addition, in another embodiment of the present invention, the porous polymer film is a transparent flexible film, and may be used as a high-reflection polymer film in which pores are formed even inside the film.

The low-reflection polymer film or high-reflection polymer film produced by the manufacturing method of the present invention may be used as a low-reflection film or high-reflection film of a solar cell, preferably a flexible organic solar cell.

Figure 1:
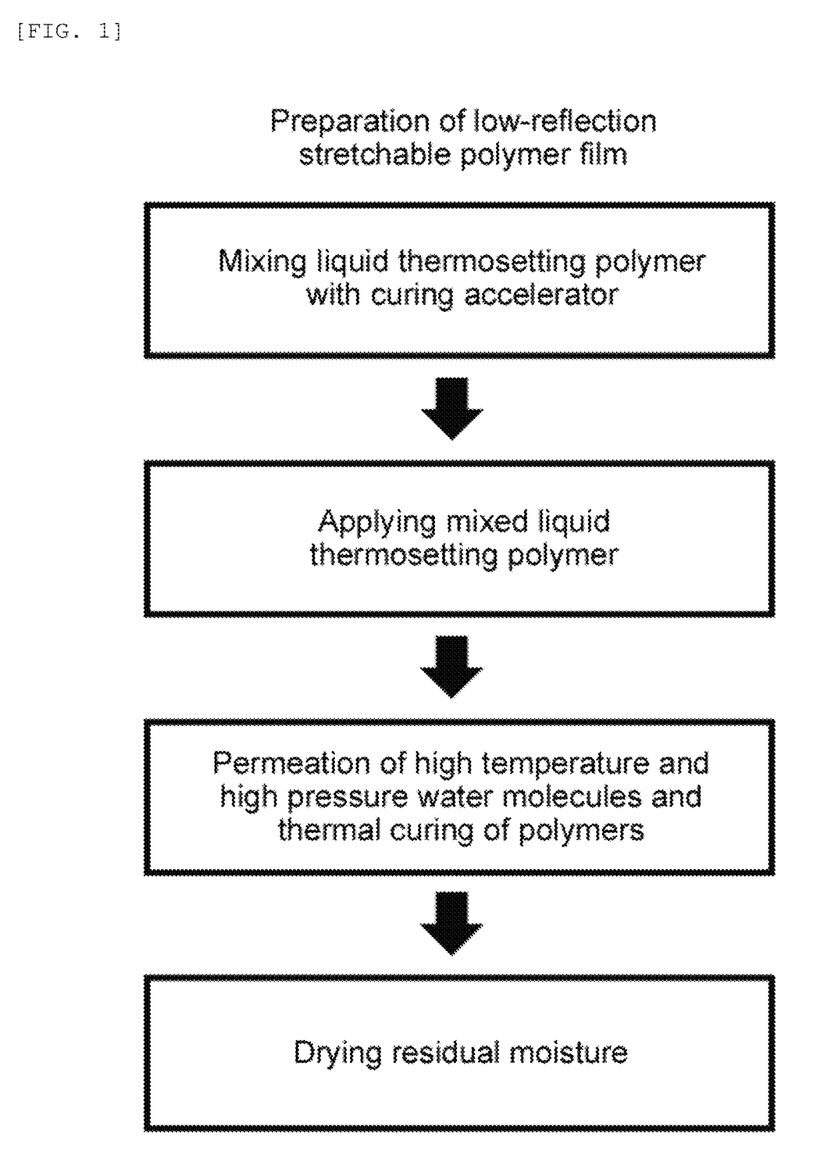
FIG. 1 is a flowchart of a process of forming a low-reflection film on a substrate according to an embodiment of the present invention.
Figure 2:
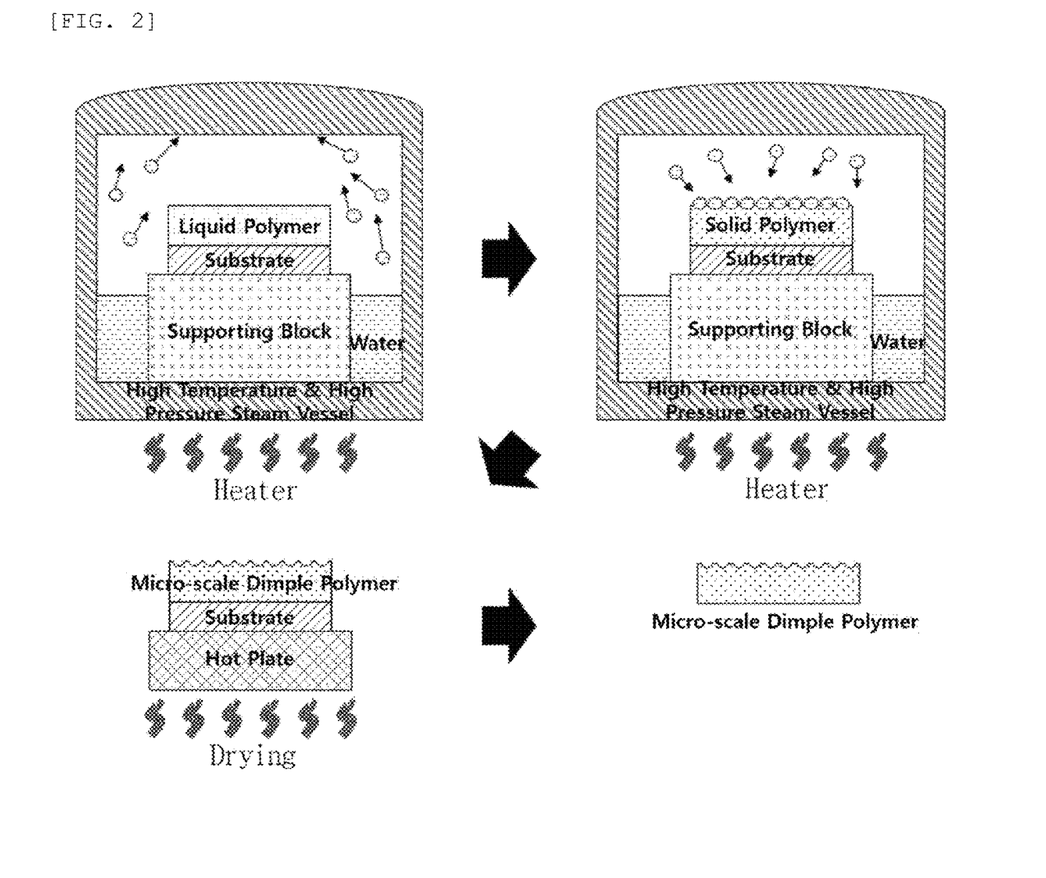
FIG. 2 is a conceptual diagram of a process of forming a low-reflection film on a substrate according to an embodiment of the present invention.

FIGS. 1 and 2 are a flow chart and a schematic diagram of a process for manufacturing a low-reflection polymer film according to an embodiment of the present invention, respectively.

In the left side of FIG. 2, a vessel capable of forming a high temperature and high pressure is prepared, and is arranged so that water collects at the bottom. The substrate is placed in the vessel using a supporting block so that the substrate is not damaged by the water and the heating wire at the bottom. A liquid thermosetting polymer is applied on the substrate, wherein the thermosetting polymer includes a curing accelerator.

In the second drawing of FIG. 2, when high-temperature and high-pressure vapor is generated by heating of the vessel, the vapor is permeated to the surface of the polymer being cured into a solid state by heating, and thus the polymer is cured while water molecules permeate the surface. In this case, the curing is completed in a short time by the curing accelerator, and the vapor permeation is performed for a short time, so that it is performed only on the surface of the polymer.

In the third drawing of FIG. 2, when the substrate on which the thermosetting polymer film is formed is taken out of the vessel and dried, the water molecules that have permeated to the surface of the polymer film is dried out, thereby forming pores (dimples) of the polymer film.

As shown in the last drawing of FIG. 2, the porous polymer film produced by the above process is separated from the substrate, and can be used as a low-reflection film having low light reflectance because pores are formed only on the surface.

Figure 3:
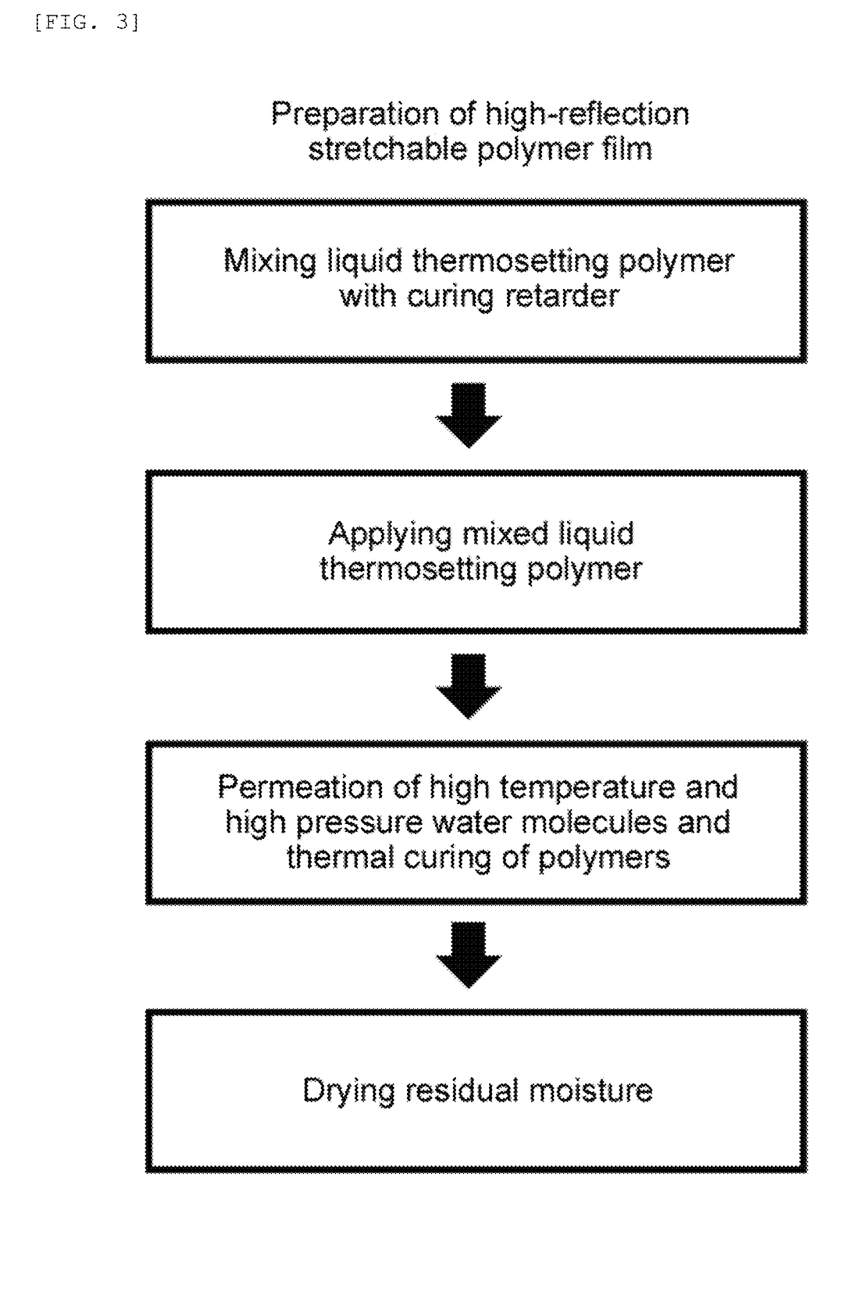
FIG. 3 is a flowchart of a process of forming a high-reflection polymer film on a substrate according to another embodiment of the present invention.
Figure 4:
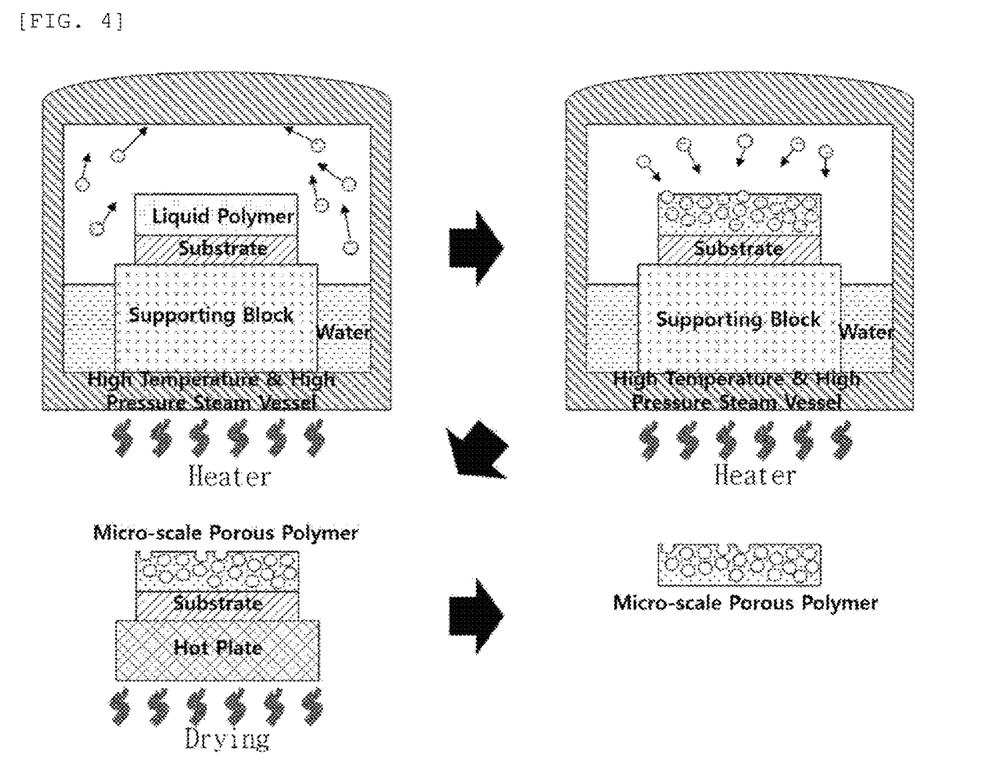
FIG. 4 is a conceptual diagram of a process of forming a high-reflection polymer film on a substrate according to another embodiment of the present invention.

FIGS. 3 and 4 are a flowchart and a schematic diagram of a process for forming a high-reflection polymer film according to another embodiment of the present invention, respectively.

In the left drawing of FIG. 4, a substrate is placed on a supporting block in a pressurized vessel, and a liquid thermosetting polymer is applied thereon, wherein the thermosetting polymer includes a curing retarder.

In the second drawing of FIG. 4, the vapor formed by heating and pressurization is permeated to the surface of the polymer being cured by heating. Since the curing rate of the polymer is slow due to the curing retarder, the vapor penetrates into the surface of the polymer and is located inside.

In the third drawing of FIG. 4, when the cured polymer film is taken out and dried, water molecules permeated into the surface and inside of the polymer film is evaporated, and a porous structure is formed in the place where evaporation occurs.

As shown in the last drawing of FIG. 4, the porous polymer film formed by the above process may be used as a high-reflection film having a high light reflectance because a porous structure is formed on the surface and inside thereof.

In addition, the light reflective film of the present invention may be produced as a light reflective film having a multilayer structure by preparing one light reflective film and then forming another light reflective film on the film in the same way. When the multilayered film is made of the same material, interlayer separation does not occur, and a deeper and more porous structure can be formed as compared to a film made of a single layer, so that the light reflectance can be increased.

Figure 5:
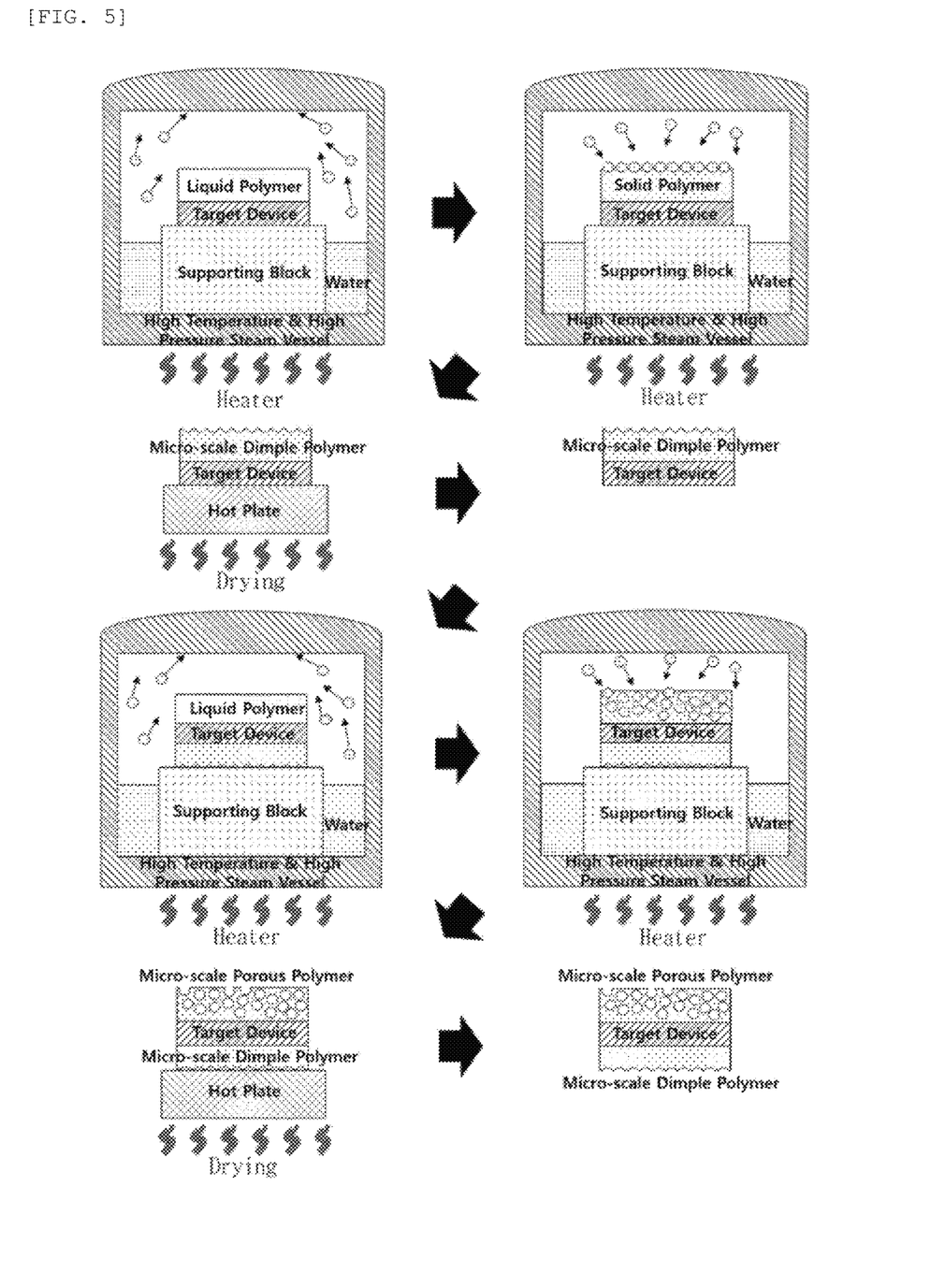
FIG. 5 is a conceptual diagram of a process of directly forming a low-reflection film and a high-reflection film on the surface of a device according to an exemplary embodiment of the present invention.

FIG. 5 is a flowchart and schematic diagram of a process of directly forming a low-reflection film and a high-reflection film on the surface of a device such as a solar cell according to an exemplary embodiment of the present invention.

First, a device is placed on a supporting block of a pressurized vessel, and a liquid thermosetting polymer is applied on a light-transmitting surface of the device, wherein the thermosetting polymer includes a curing accelerator. When high-temperature and high-pressure vapor is generated by heating the pressurized vessel, the vapor permeates the surface of the polymer being cured into a solid state by heating, and thus the polymer is cured while water molecules permeate the surface. When the solar cell having the polymer film formed on the light-transmitting surface is taken out of the vessel and dried, the water molecules that have permeated to the surface of the polymer film is dried out, thereby forming a low-reflection film in which pores (dimples) of the polymer film are formed.

The device on which the low-reflection film is formed is again placed in a pressurized vessel, so that the low-reflection film goes down and the bottom of the device rises up. A liquid thermosetting polymer is applied to the bottom of the device, wherein the thermosetting polymer contains a curing retarder. The vapor formed by heating and pressurization is permeated to the surface of the polymer being cured by heating. Since the curing rate of the polymer is slow due to the curing retarder, the vapor penetrates into the surface of the polymer and is even located inside. When the cured polymer film is taken out and dried, water molecules permeated to the surface and inside of the polymer film is evaporated, and a high-reflection film in which a porous structure is formed in the place where the water molecules evaporate is formed on the bottom of the device. In an example of the present invention, it was confirmed that an absorption rate of a flexible organic solar cell to which the low-reflection film and the high-reflection film of the present invention are applied is increased by about 10% compared to that of the flexible organic solar cell to which the low-reflection and the high-reflection film of the prior art are applied.

In view of this, a preferred embodiment of the present invention is concerned with a method for producing a light reflective film, the method comprising the steps of: applying a thermosetting polymer resin on a substrate; and curing the polymer resin while spraying vapor thereto, characterized in that the light reflectance of the polymer film is controlled by adjusting the curing rate of the thermosetting polymer resin.

When the porous polymer film produced by the manufacturing method of the present invention is made of a stretchable material, the light reflectance may be adjusted according to the elongation. In an example of the present invention, it was confirmed that when the stretchable porous polymer film is stretched, the light transmittance is increased and the light reflectance is decreased.

The porous polymer film of the present invention may also be adhered onto an uneven or curved surface. In this case, the polymer film is preferably a polymer having an elongation of 300% or more, preferably 400% or more, and most preferably 800% or more. For example, silicone rubber may be used.

Since such a polymer film has excellent elasticity, it can be easily attached on an uneven surface through a method of stretching the film and attaching it on a spherical surface.

The polymer film may be used, for example, in a spherical device containing a solar cell in which a low-reflection film and a high-reflection film are respectively attached to a surface of a spherical lens for light concentration, and a low-reflection and high-reflection films are attached therein.

Accordingly, one embodiment of the present invention relates to a self-powered device, comprising: a power supply unit comprising a solar cell module; a driving unit receiving power from the power supply unit and driving the device; and a cover body accommodating the power supply unit and the driving unit therein and made of a material capable of transmitting light, wherein the low-reflection polymer film of the present invention is attached to an upper surface of the cover body, and the high-reflection polymer film of the present invention is attached to a lower surface of the cover body.

Figure 6:
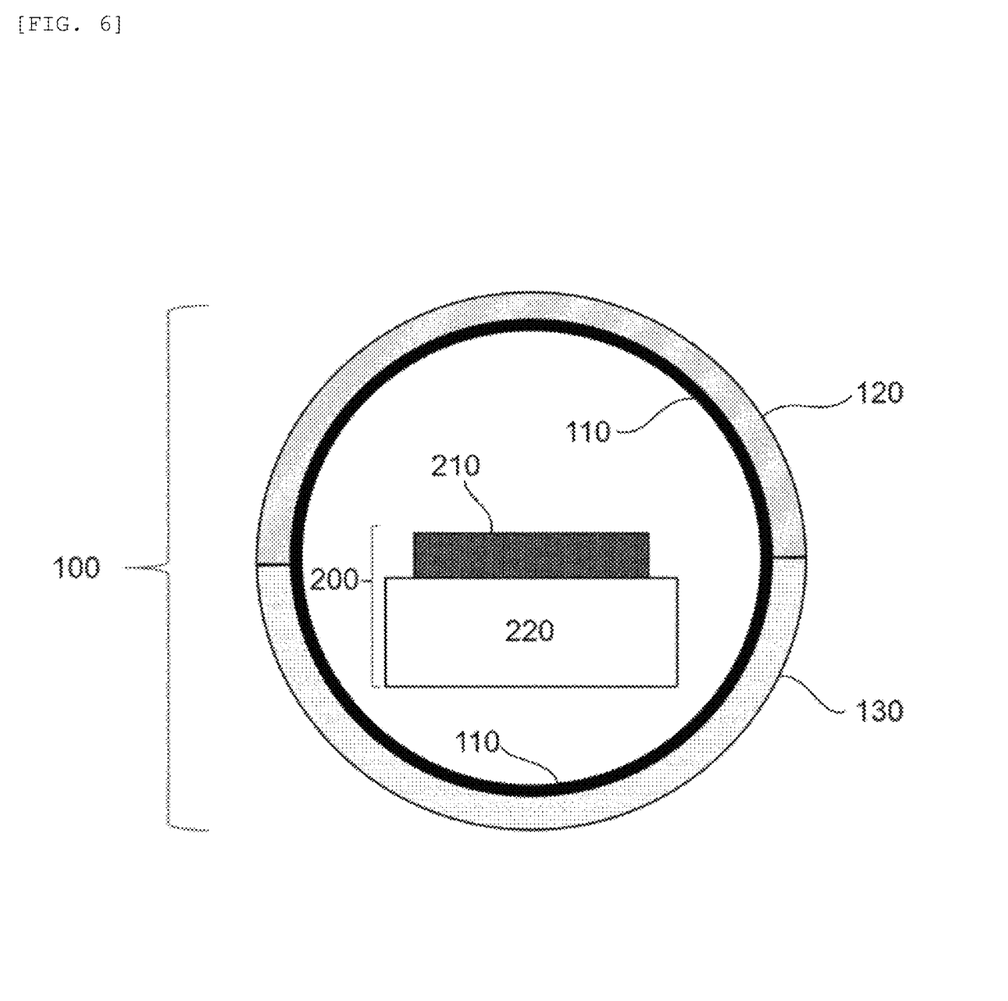
FIG. 6 is a conceptual diagram of a spherical system that can be moved on the water surface through solar power generation.

An exemplary self-powered device of the present invention is shown in FIG. 6. The device of FIG. 6 is a conceptual diagram of a spherical electrical operating device that uses power produced by solar cells as a power source.

The spherical electrical operating device 100 comprises, as a cover body, two hemispherical lenses 110 bonded to each other for concentrating light, wherein a power supply and driving system 200 for operating the spherical device are installed inside the spherical lens 110. The power supply and driving system 200 includes: a power supply unit 210 including a solar cell in which the low-reflection film and the high-reflection film of the present invention are formed on the upper and lower surfaces thereof, respectively; and a driving unit 220 for operating the entire system. In this case, the driving unit 220 can be applied by a conventional electrical operating device, for example, a system that collects electricity generated through solar cells, or when forming a buoy on the sea through an LED connection or connecting a mechanical operation unit, a robot that can float and move on the water surface, or the like. A stretchable low-reflection polymer film 120 and a stretchable high-reflection polymer film 130 are attached to the upper and lower surfaces of the hemispherical lens 110, respectively. In this case, the high-reflection film 130 may be coated with a super water-repellent.

The spherical electrical operating device of FIG. 6 uses a solar cell as a power source and thus can operate without supply of external power, and can increase the photoelectric conversion efficiency of the solar cell by low-reflection and high-reflection polymer films applied to each hemisphere. In addition, by applying a super water-repellent coating treatment such as a PTFE-based water-repellent coating to the stretchable high-reflection polymer film on the surface of the spherical lens in contact with the water surface, it can be maintained on the water surface for a long time due to an increase in buoyancy. Since the spherical electrical operating device manufactured in this way does not require an external power source, it can be operated for a long time, and thus can be applied to industries that require environmental monitoring, such as ecosystem monitoring on sea level and robots for removing green algae.

EXAMPLES

Hereinafter, the present invention will be described in more detail by way of examples. However, these examples show some experimental methods and compositions in order to illustrate the present invention, and the scope of the present invention is not limited to these examples.

Preparation Example 1

Preparation of Low-Reflection Polymer Film

A pressurized vessel as shown in FIG. 2 was prepared to produce a low-reflection polymer film.

11 g of liquid polydimethylsiloxane (PDMS) (base:curing agent=10:1) was mixed with 0.033 g of Platsil 71/73X Accelerator (Polytek), a curing accelerator, and then applied with a thickness of about 400 μm on a glass substrate by a spin coating (200 rpm) method.

The temperature of the pressurized vessel was set to 120° C. and the pressure was set to 90 kPa to form a high-temperature and high-pressure vapor, which was maintained for about 20 minutes so as to sufficiently permeate the liquid thermosetting polymer.

The thermosetting polymer begins to cure in a solid state by the curing accelerator before the high temperature and high pressure water molecules deeply penetrate, and a shallow single porous layer, such as a dimple, is formed on the thermosetting surface.

The polymer completely cured to a solid state was taken out of the pressure vessel, and subjected to a drying process in a convection oven at about 70° C. for about 30 minutes to remove residual moisture on the polymer surface.

Figure 7:
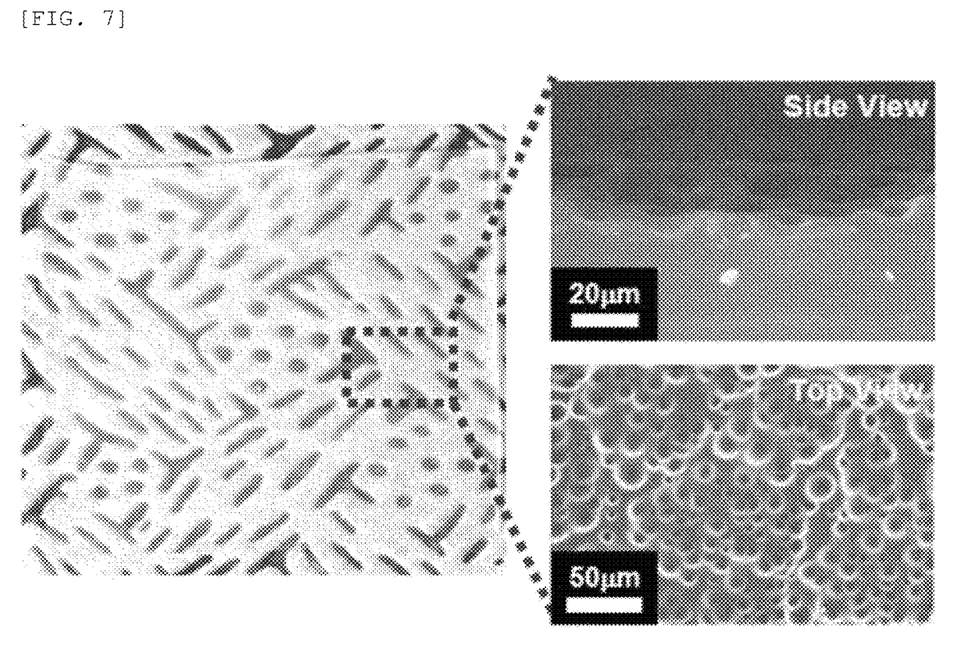
FIG. 7 is an image and a cross-sectional SEM image of the low-reflection porous polymer film prepared in an example of the present invention.

An image of the prepared low-reflection porous polymer film and a scanning electron microscope (SEM) image of a cross section are shown in FIG. 7. It can be confirmed that the prepared low-reflection film is transparent enough to clearly see the pattern of the substrate, and small pores are formed near the surface.

Preparation Example 2

Preparation of High-Reflection Polymer Film

A high-reflection polymer film was prepared according to the procedure shown in FIG. 4.

11 g of liquid polydimethylsiloxane (PDMS) (base:curing agent=10:1) was mixed with 2.2 g of Platsil 71/73 Retarder (Polytek), a curing retarder, and then applied with a thickness of about 400 μm on a glass substrate by a spin coating (200 rpm) method.

The temperature of the pressurized vessel was set to 120° C. and the pressure was set to 90 kPa to form a high-temperature and high-pressure vapor, which was maintained for about 20 minutes so as to sufficiently permeate the liquid thermosetting polymer.

Vapor penetrates deeper into the interior of the polymer in which the curing has progressed slowly by the curing retarder, thereby forming a deeper porous layer.

The polymer completely cured to a solid state was taken out of the pressure vessel, and subjected to a drying process in a convection oven at about 70° C. for about 30 minutes to remove residual moisture on the polymer surface.

Figure 8:
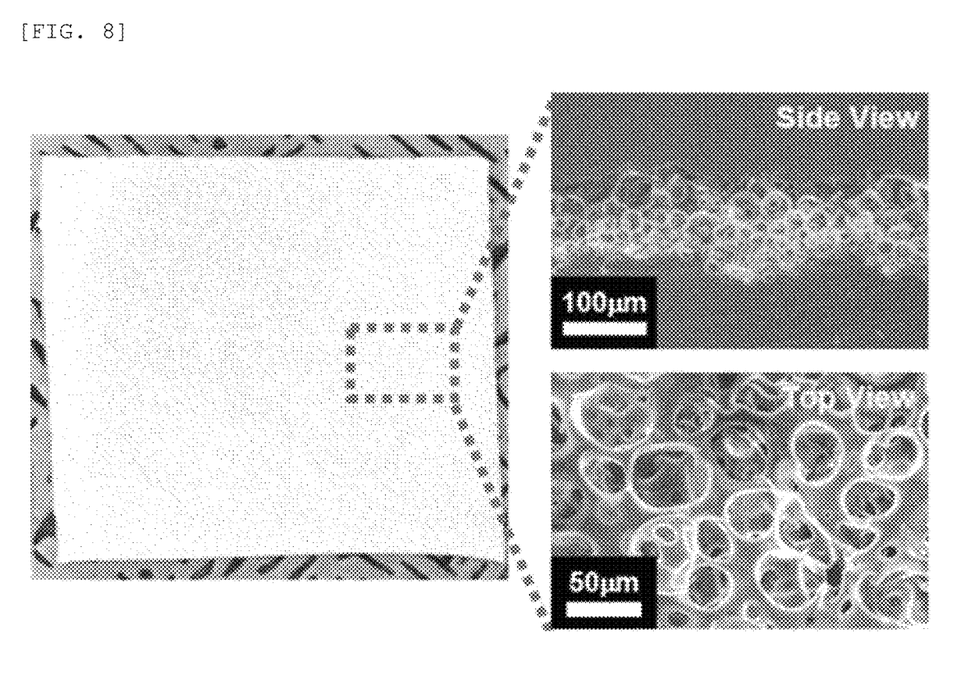
FIG. 8 is an image and a cross-sectional SEM image of the high-reflection porous polymer film prepared in an example of the present invention.

An image of the prepared high-reflection porous polymer film and a SEM image of a cross section are shown in FIG. 8. It can be seen that the manufactured high-reflection film looks white so that the pattern of the substrate is not visible at all, and thus visible light is not well transmitted therethrough, and it can be confirmed that the relatively large pores have penetrated deep from the surface.

Experimental Example 1

Change in the Depth of the Porous Polymer Structure According to the Curing Rate Control A liquid PDMS polymer was mixed with Platsil 71/73X Accelerator (Polytek), a curing accelerator, at 3% by weight and 5% by weight, and compared with the case where no curing accelerator was added. The preparation of the film was performed by the method described in Preparation Example 1. A cross section of the prepared film is shown in FIG. 9a.

Figure 9A:
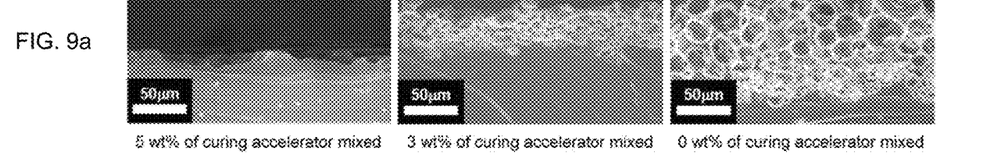
FIG. 9a shows a cross-sectional SEM image of the film according to the curing accelerator content of a PDMS polymer film.

In FIG. 9a, it is confirmed that pores of a relatively large size are formed in a large area when the curing accelerator is not used at all. It can be seen that as the curing accelerator is used, the pore size decreases and the penetration depth becomes shallow.

As another type of polymer, a platinum catalyst-based additive silicone (Sorta clear 30, Smooth-on) was used, and Platsil 71/73X Accelerator (Polytek), a curing accelerator, and Platsil 71/73 Retarder (Polytek), a curing retarder, were used in 20% by weight, respectively, and compared with the case where no curing accelerator or curing retarder was used. The preparation of the film was performed by the method described in Preparation Examples 1 and 2. A cross section of the prepared film is shown in FIG. 9b.

Figure 9B:
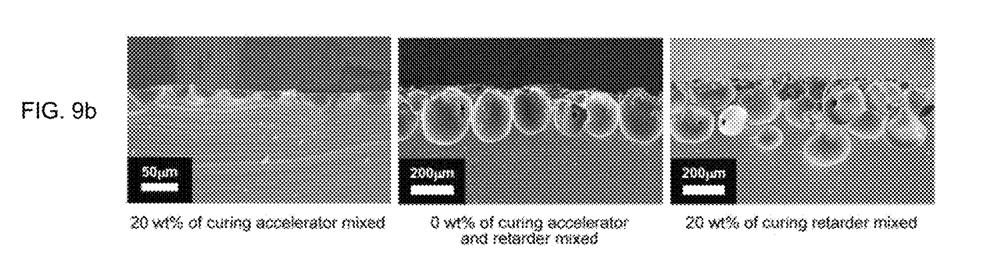
FIG. 9b shows a cross-sectional SEM image of the film according to an addition of a curing accelerator or curing retarder of a silicone rubber film.

In FIG. 9b, the film using the curing accelerator exhibited a shape substantially similar to the PDMS film prepared using the curing accelerator. It can be seen that when the curing retarder is mixed, pores of a larger size are formed deeper.

Figure 10:
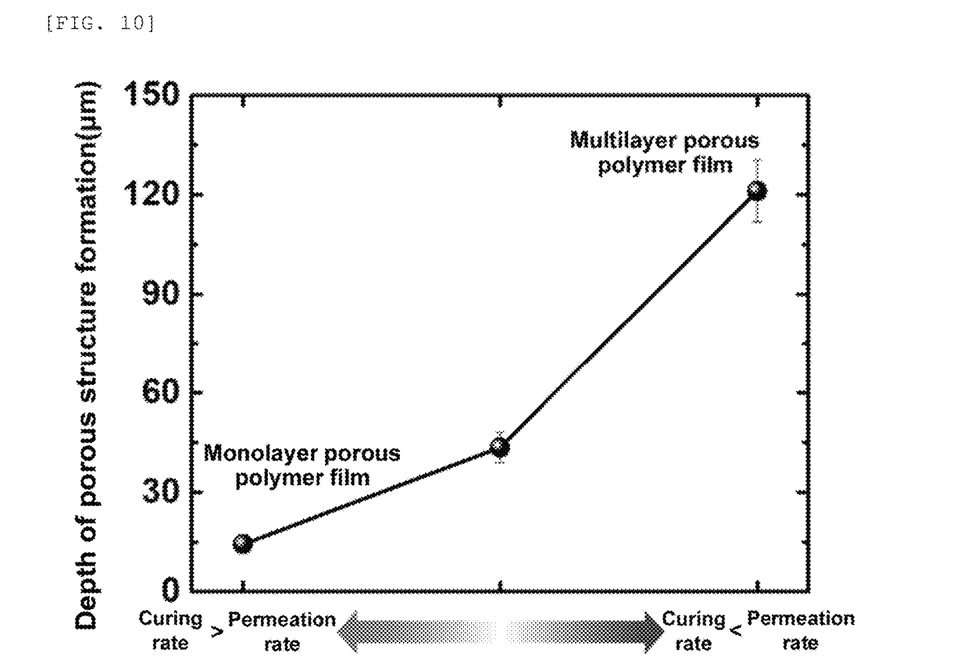
FIG. 10 is a graph showing the depth of the porous structure according to a curing rate of a polymer.

As shown in FIG. 10, it can be seen that the depth of the porous structure of the polydimethylsiloxane (PDMS) film can be controlled from about 15 μm to about 120 μm by controlling the curing rate.

Experimental Example 2

Analysis of Reflectance in Visible Light Region of Low-Reflection and High-Reflection Films The reflectance of the low-reflection film and the high-reflection film prepared in Preparation Examples 1 and 2, respectively, was compared with that of a conventional PDMS film in which a porous structure was not formed.

Figure 11:
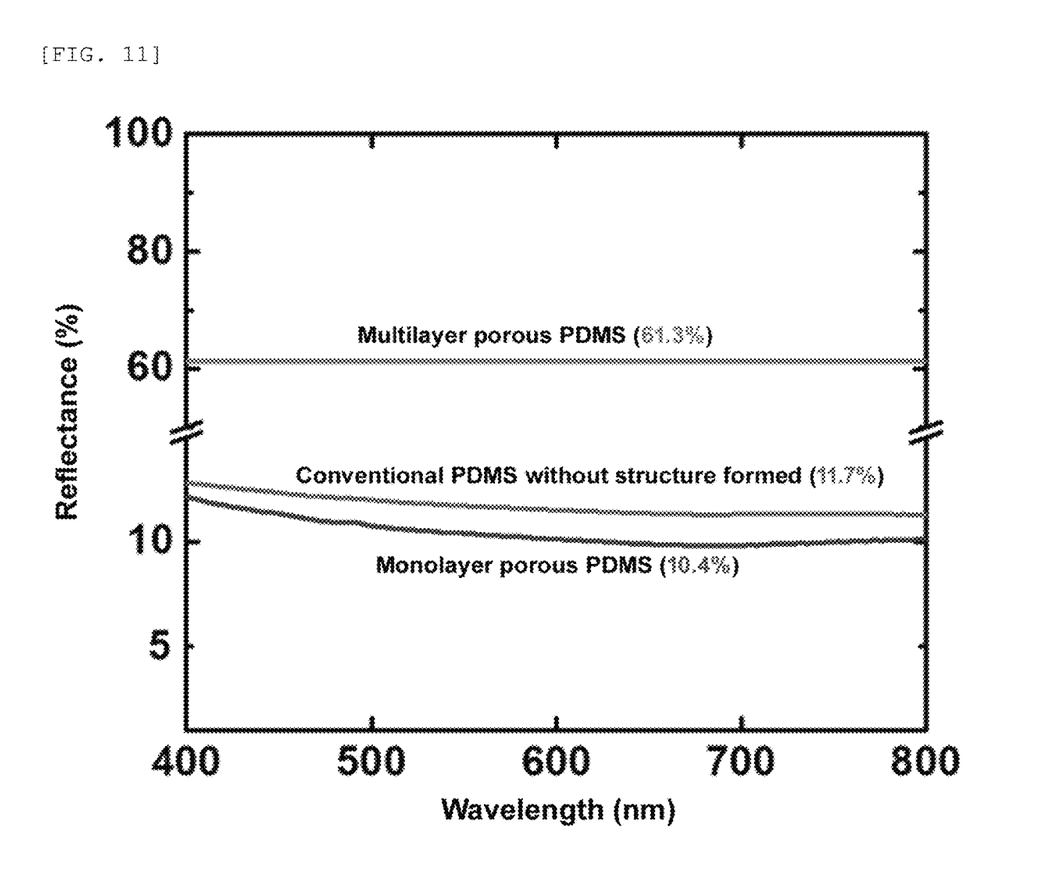
FIG. 11 shows the results of measuring light reflectance in the visible light region according to the type of polymer film.

The reflectance was measured in a visible light region having a wavelength range of 400 to 800 nm using an ultraviolet visible light spectrometer (UV/Vis Spectrometer), and the results are shown in FIG. 11.

In FIG. 11, the low-reflection porous PDMS film exhibited a reflectance of about 10.4% in the visible light region, which is lower than that of a conventional flat PDMS (reflectance 11.7%) film in which the structure was not formed. Meanwhile, it was confirmed that the high-reflection PDMS film showed a high reflectance of about 61.3%.

Experimental Example 3

Analysis of Performance Improvement of Flexible Organic Solar Cell

An experiment was conducted to confirm the effect of improving the solar cell efficiency of the low-reflection and high-reflection films prepared in Preparation Examples 1 and 2.

Figure 12A:
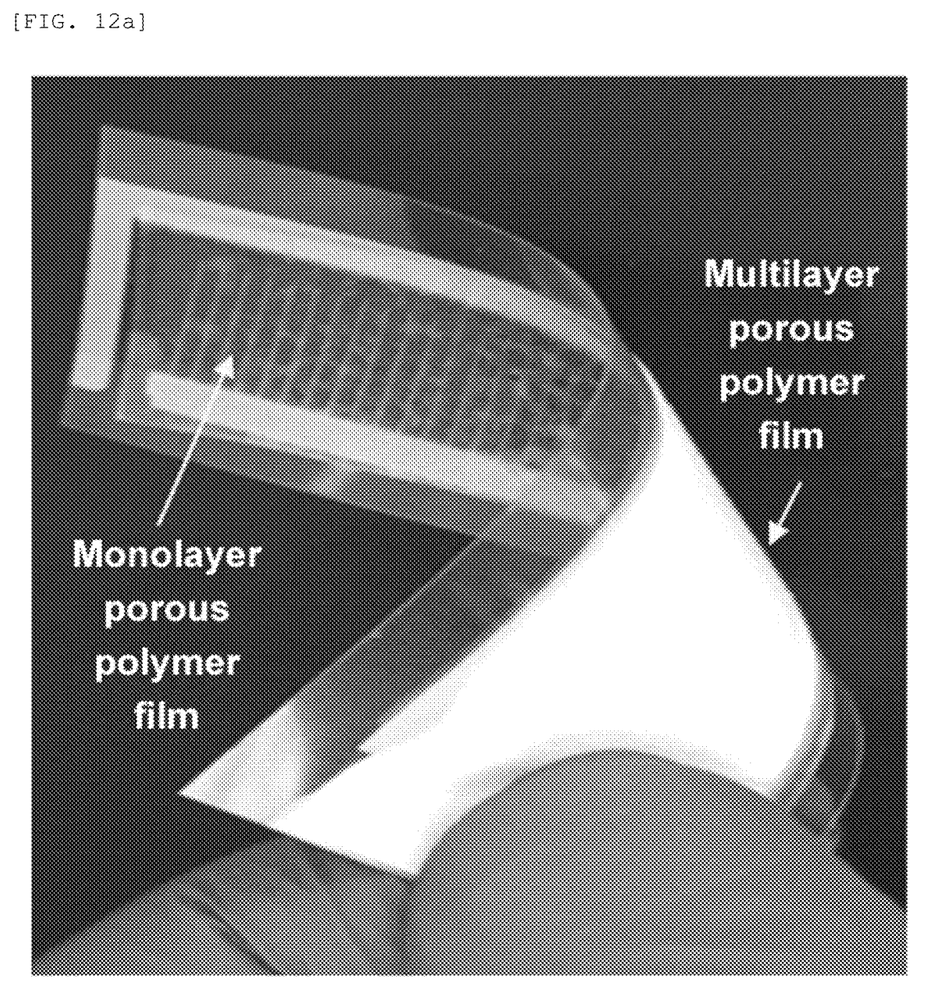
FIG. 12a is an image of a low-reflection film and a high-reflection film of the present invention applied to a commercial flexible organic solar cell.
Figure 12B:
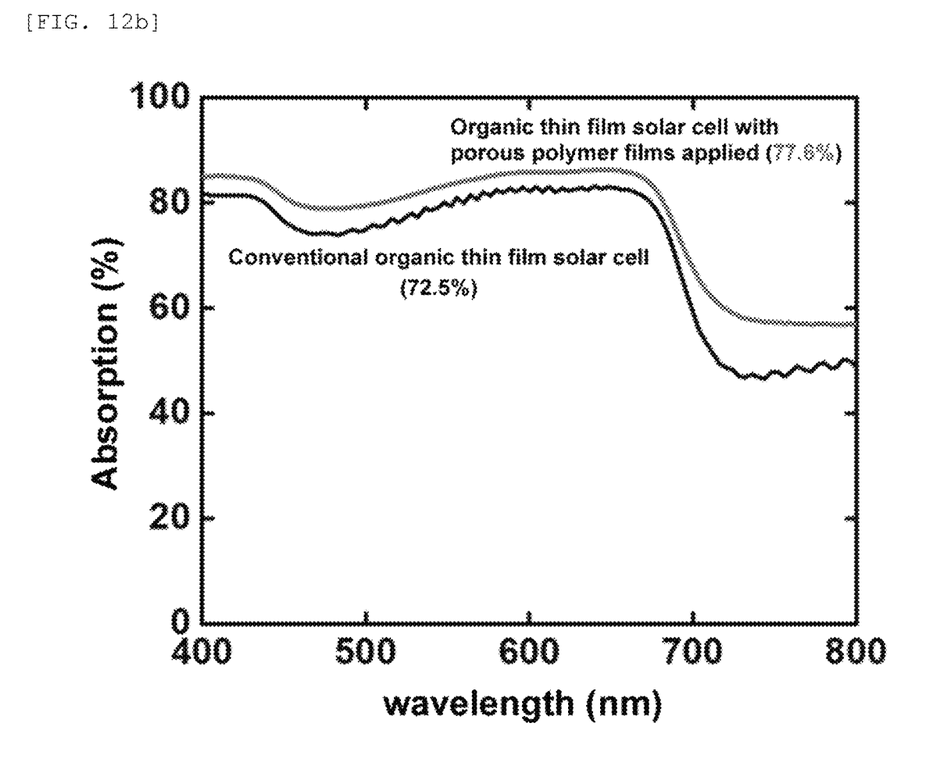
FIG. 12b is a graph showing the light absorption of a flexible organic solar cell before and after the light reflective film of the present invention is applied.

As shown in FIG. 12a, a low-reflection film was applied to an upper surface of a commercial flexible organic solar cell (Unidirectional Solar Tape Grade A, InfinityPV), and a high-reflection film was applied to a lower surface thereof to confirm light absorption. The measurement results are shown in FIG. 12b.

In general, the commercially available organic thin film solar cell has an absorption rate of about 72.5%. Meanwhile, when all of the porous polymer films produced in the present invention are applied thereto, it showed a high overall absorption rate of 77.6% at a wavelength of 400 to 800 nm, and thus it was confirmed that the absorption rate can be increased to about 1.1 times.

Experimental Example 4

Confirmation of the Change in Reflectance According to the Elongation of the Stretchable Polymer Film In this experimental example, a stretchable polymer film prepared using the silicone rubber in Experimental Example 1 and without adding a curing accelerator and a curing retarder was used.

Figure 13A:
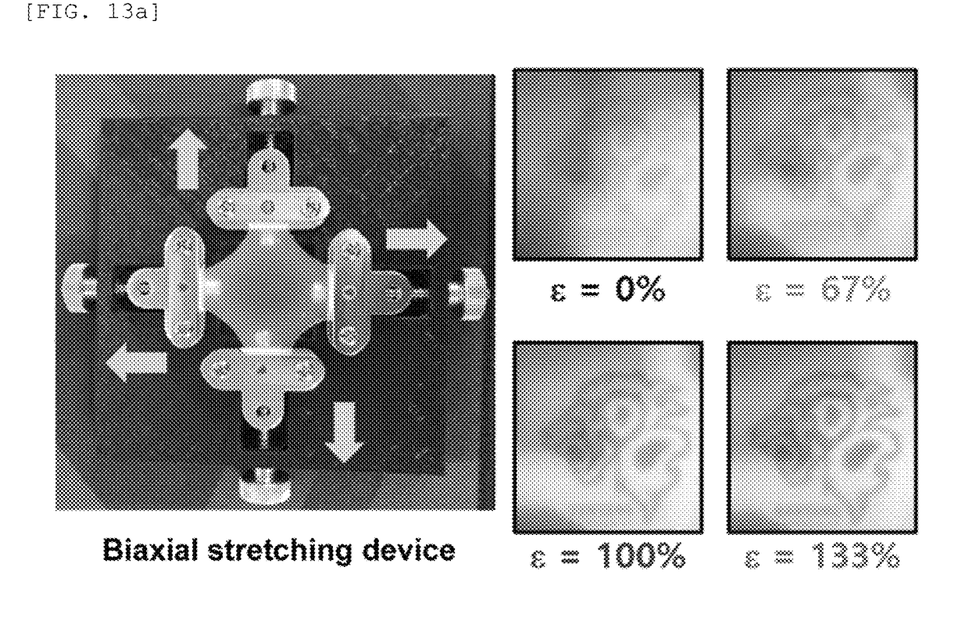
FIGS. 13a and 13b show a biaxial stretching device for a silicone rubber film, and light transmittance according to each elongation.

The film was stretched in a biaxial direction using an apparatus as shown in FIG. 13a to measure light reflectance according to the elongation.

Figure 13B:
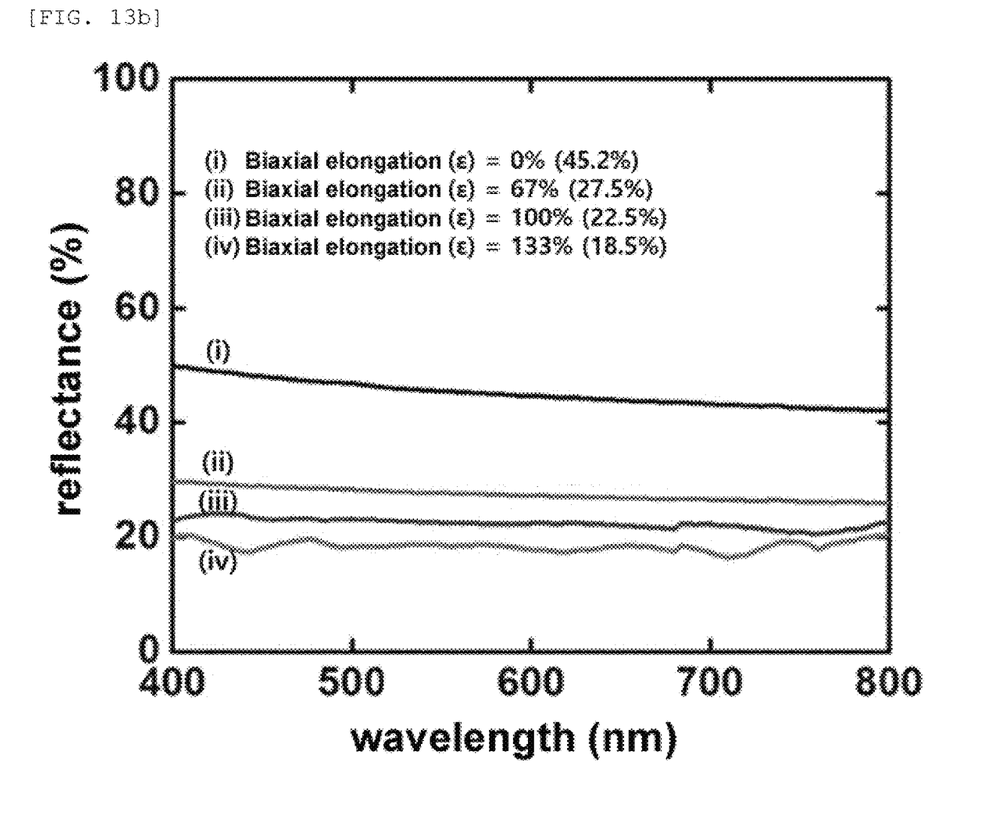

In FIG. 13b, the film having an elongation of 0% has a reflectance of about 45.2%, but when the elongation was increased to 67%, the reflectance was decreased to 27.5%. It was confirmed that as the elongation was increased to 133%, the reflectance was decreased to 18.5%.

As described above, specific embodiments of the present invention have been described in detail. It will be apparent to those of ordinary skill in the art that these specific descriptions are only preferred embodiments, and thus the scope of the present invention is not limited thereto. Accordingly, it will be said that the substantial scope of the present invention is defined by the appended claims and their equivalents.

What are claimed are:

1. A method for preparing a porous polymer film, the method comprising the steps of:
applying a thermosetting polymer resin on a substrate; and
curing the thermosetting polymer resin while spraying vapor thereto to form a porous structure on a surface or on a surface and inside of the porous polymer film,
wherein a pore formation depth is controlled within a range from about 15 μm to about 120 μm by adjusting a rate of the curing of the thermosetting polymer resin, such that (i) when the curing rate of the thermosetting polymer resin is faster than a permeation rate of the vapor, a porous structure is formed only on a surface of the polymer film; and (ii) when the curing rate of the thermosetting polymer resin is slower than the permeation rate of the vapor, a porous structure is formed on the surface and interior of the polymer film,
wherein the step of curing the thermosetting polymer resin while spraying vapor is performed by placing a supporting block on a bottom of a pressure vessel capable of forming high temperature and high pressure; placing water on the bottom of the vessel; placing the substrate on which the thermosetting polymer resin is applied on the supporting block; and then applying the high temperature and high pressure to form the vapor so that the vapor is permeated to the surface of the polymer being cured,
wherein the high temperature is from 100° C. to 140° C. and the high pressure is from 70 kPa to 200 kPa, and
wherein the porous polymer film is a light reflective film, and a light reflectance of the light reflective film is adjusted by the controlling of the pore formation depth.

2. The method of claim 1, further comprising the step of forming the thermosetting polymer resin into a semi-solid state before the step of spraying vapor to the thermosetting polymer resin.

3. The method of claim 1, wherein the curing of the thermosetting polymer resin is accelerated to form a porous structure only on the surface of the porous polymer film.

4. The method of claim 1, wherein the curing of the thermosetting polymer resin is retarded to form a porous structure on the surface and inside of the porous polymer film.

5. The method of claim 1, wherein the thermosetting polymer resin is selected from the group consisting of polydimethylsiloxane (PDMS), silicone rubber, polymethyl methacrylate (PMMA), polyurethane (PU), polyester, polyimide (PI), polycarbonate (PC) and epoxy resin.

6. The method of claim 1, wherein the thermosetting polymer resin contains a curing accelerator.

7. The method of claim 1, wherein the thermosetting polymer resin contains a curing retarder.

8. The method of claim 1, wherein the porous polymer film has an elongation of 300% or more.

9. The method of claim 1, wherein the substrate is a stretchable polymer, and the method further comprises the steps of:
stretching the stretchable polymer before the step of applying the thermosetting polymer resin, and
releasing the stretching of the stretchable polymer after the step of curing the thermosetting polymer resin.

10. The method of claim 1, wherein the high temperature is from 100° C. to 120° C. and the high pressure is from 80 kPa to 140 kPa.

11. A light reflective polymer film prepared by the method of claim 1 and having a light reflectance adjusted by controlling the pore formation depth.

12. The light reflective polymer film of claim 11, wherein the light reflectance is adjusted by controlling an elongation of the light reflective polymer film.

13. The light reflective polymer film of claim 11, wherein the light reflective polymer film has an elongation of 300% or more.

14. The light reflective polymer film of claim 11, wherein the light reflective polymer film is a low-reflection polymer film having a porous structure only on the surface thereof.

15. The light reflective polymer film of claim 11, wherein the light reflective polymer film is a high-reflection polymer film having a porous structure on the surface and inside thereof.

16. A self-powered device, comprising:
a power supply unit comprising a solar cell module;
a driving unit receiving power from the power supply unit to drive the device; and
a cover body accommodating the power supply unit and the driving unit therein and made of a material capable of transmitting light,
wherein a low-reflective polymer film prepared by the method of claim 1 and prepared by accelerating the curing of the thermosetting polymer resin, is attached to an upper surface of the cover body; and
a high-reflective polymer film prepared by the method of claim 1 and prepared by retarding the curing of the thermosetting polymer resin, is attached to a lower surface of the cover body.

17. The self-powered device of claim 16, wherein the cover body is in the form of a spherical lens for concentrating the transmitted light to the solar cell.

18. The self-powered device of claim 16, wherein the high-reflective polymer film is water-repellent.

* * * * *